April 10, 1956     J. ROEHRIG     2,741,475
VEHICLE STABILIIZER AND HELPER SPRING
Filed Oct. 21, 1953
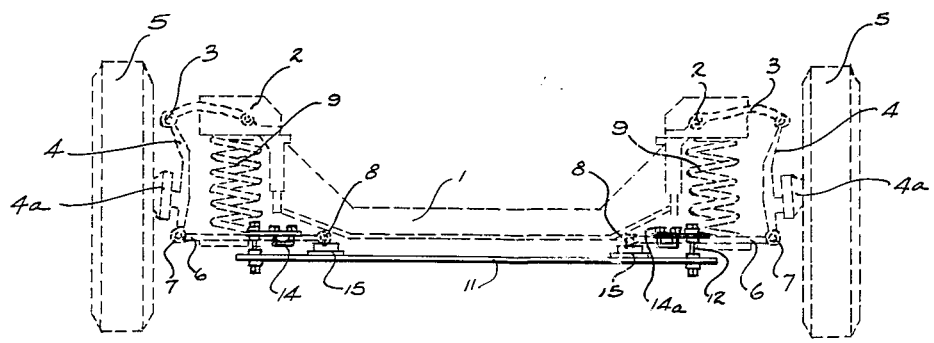
FIG 1
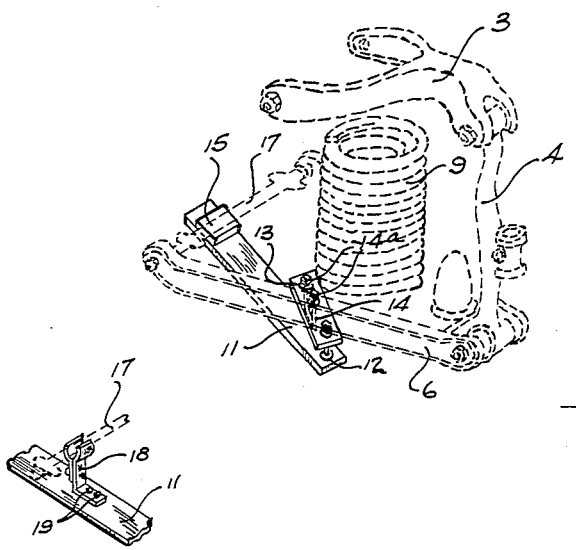
FIG 2
FIG 3
INVENTOR.
JOHN ROEHRIG
BY
William J. Ruano
ATTORNEY 2,741,475

VEHICLE STABILIZER AND HELPER SPRING

John Roehrig, Pittsburgh, Pa.

Application October 21, 1953, Serial No. 387,425

3 Claims. (Cl. 267—11)

This invention relates to a knee action, front wheel suspension for vehicles, and more particularly to a stabilizer and helper spring for such suspension.

In the use of knee-action spring suspensions for vehicles it has been found that after a predetermined amount of use or wear of such suspensions the helical springs lose their original springiness or ability to spring back to their original length. In other words the spring becomes set and shrinks in overall length. This results in lowering of the front end of the vehicle and toeing of the wheels which, in turn, results in abnormal wear of not only the suspension parts, but the tires. Also the weakened coil springs cause abnormal tilt of the car when turning corners, making driving difficult and dangerous.

An object of the present invention is to provide a novel vehicle stabilizer and helper spring that may be mounted on an existing knee action suspension, after predetermined use thereof, so as to restore the suspension to its original operating condition.

A more specific object of the invention is to provide a vehicle stabilizer and helper spring that will stabilize as well as help or aid the helical springs of a vehicle, knee action suspension, to effectively lengthen such springs after they have lost their ability to spring back to their original length, and in so doing, restore original alignment of the wheels.

Other objects and advantages will become apparent from a study of the following description taken with the accompanying drawing wherein:

Figure 1 is a front elevational view of a vehicle, front wheel suspension assembly of the knee action type wherein conventional parts are shown in dotted lines and the stabilizer and helper spring embodying the principles of the present invention are shown in full lines, Figure 2 is an enlarged, fragmentary, perspective view of an end portion of the suspension assembly shown in Figure 1, and Figure 3 shows a modified connection between the spring and lower control arm shaft.

Referring more particularly to Figures 1 and 2, numeral 1 denotes a cross frame member of a vehicle, such as an automobile or truck, upon which are mounted shock absorbers 2 having pivotally mounted upper control arms 3 which are pivotally connected to steering knuckle supports 4 for mounting king bolts 4a and, in turn, the wheels 5. Lower control arms 6 are pivotally connected at one end to the steering knuckle supports 4 by lower support pins 7 whereas the other ends of arms 6 are pivotally connected to the bottom side of the cross frame member 1 by bushings 8. Between lower control arms 6 and the shock absorbers 2 are mounted helical springs 9. Thus arms 3, steering knuckle supports 4 and arms 6 comprise three parts of a pivotal parallelogram (the fourth part being a side portion of the frame) whereby up and down pivotal movement of arms 3 and 6 are allowed which are cushioned by the shock absorbers 2 as well as the tension of springs 9. The parts herein above described are conventional in knee action suspensions. After predetermined wear of the car springs 9 lose some of their springiness and ability to spring back to their original length. The overall height or length of the springs will shrink in size causing steering knuckle supports 4 to tilt inwardly in a downward direction and thus cause a similar tilt of the wheels, as well as lowering of the front end of the vehicle, causing abnormal wear of the tires, instability of the suspension and making the vehicle very difficult to control.

In accordance with the present invention the above effects are overcome by the provision of a vehicle stabilizer and helper spring 11 in the form of a wide strip of spring steel of the order of 1¾" wide extending along substantially the entire length of the cross frame member 1.

The ends of spring 11 are rigidly secured to intermediate portions of the lower control arms 6 by means of conventional stabilizer links 12 of well-known construction. Such link 12 is shown more clearly in Figure 2, having a lower portion rigidly fastened by a bolt and nut to the end of spring 11 and an upper portion rigidly fastened to one end of tie plate 13. The other end portion of plate 13 is rigidly secured to arm 6 by means of a U bolt 14 whose arms extend upwardly through two holes in plate 13, and alongside arm 6 and the extremities of which are held by nuts 14a. Mounted on leaf spring 11 so as to engage lower control arm shaft 17, are a pair of rubber bumper blocks 15 having flat faces for engaging the control arm shaft 17.

In operation, as the wheels 5 move up and down as the result of irregularity in the roadway surface, they will effect up and down movements of the upper and lower control arms 3 and 6, which movements are resisted by the tension of helical springs 9 and are cushioned by shock absorbers 2. And since the ends of stabilizer and helper spring 11 are rigidly fastened to the lower control arms 6, such up and down movements of the control arm about bushings 8 as a pivot are also resisted by the tension of the stabilizer and helper spring 11. In this sense leaf spring 11 acts as a helper spring to springs 9. Also as springs 9 shorten in overall length as the result of usage or wear because the springs 9 have set or become permanently deformed to a shorter length, spring 11, by pushing upwardly through control arm shaft 17, will pull control arms 6 downwardly and, in effect, stretch springs 9 to their original length and thus restore them to their original operating condition. In so doing any downward and inward tilting of the steering knuckle supports 4 as a consequence of shortening of the length of springs 9 will be compensated for, so as to restore the wheels from a tilted or toed condition to a more nearly vertical position as they were originally when springs 9 were new.

Figure 3 shows a modification of the means for connecting spring 11 to the control arm shaft 17, which comprises clamps 18 fastened by bolts 19 to the spring. By rigidly clamping spring 11 to the lower control arm shafts 17, both compression and rebound control are obtained, since the end of spring 11 would bend upwardly when the frame is pushed down, and will bend downwardly when the frame rebounds or springs back. Thus, spring 11 acts as a helper spring, stabilizer, and shock absorber.

In sharply steering around a corner, which causes shifting of the weight onto one wheel, such shifting is resisted not only by spring 9 thereof but by spring 11 which therefore tends to stabilize the car and prevent abnormal sidewise tilt as the result of such corner steering.

Thus it will be seen that I have provided an efficient stabilizer and helper spring which is of relatively simple and inexpensive construction and which can be easily and quickly mounted underneath a front wheel suspension assembly of the knee action type to compensate for shortening of the length of the helical springs of such assembly resulting from usage; also which stabilizer and helper spring will aid the helical springs in resisting up and down movements of the wheels as well as preventing abnormal tilting of a vehicle when turning corners sharply, thereby stabilizing the vehicle and greatly aiding steering control; also which will restore tilted wheels and lowered front ends of a vehicle, because of shortening of the helical knee action springs, to their original vertical positions and thus also minimize undue wear of the tires.

While I have illustrated and described an embodiment of my invention, it will be understood that this is by way of illustration only, and that various changes and modifications may be made within the contemplation of my invention and within the scope of the following claims.

I claim:

1. In a vehicle front wheel suspension assembly of the knee action type, including steering control supports pivotally mounted by means of lower control arms and lower control arm shafts to the underside of a cross frame and between which arms and cross frame are mounted helical springs to resist pivotal movements of said arms, in combination, a stabilizer and helper spring in the form of a long leaf spring spaced underneath said cross frame and having ends rigidly secured to said lower control arms and being stressed to support part of the load to raise said cross frame after said helical springs have shortened from use, and rubber cushioning blocks provided on said stabilizer and helper spring engaging said lower control arm shafts, whereby pivotal movements of said arms will be resisted by said leaf spring.

2. In a vehicle front wheel suspension assembly of the knee action type, including steering control supports pivotally mounted by means of lower control arms and lower control arm shafts to the underside of a cross frame and between which arms and cross frame are mounted helical springs to resist pivotal movements of said arms, in combination, a stabilizer and helper spring in the form of a long leaf spring spaced adjacent said cross frame and having ends rigidly secured to said lower control arms and being stressed to support part of the load to raise said cross frame after said helical springs have shortened from use, said stabilizer and helper spring being fastened intermediate its length to said lower control arm shafts, whereby pivotal movements of said arms will be resisted by said leaf spring.

3. In a vehicle front wheel suspension assembly of the knee action type, including steering control supports pivotally mounted by means of lower control arms and lower control arm shafts to the underside of a cross frame and between which arms and cross frame are mounted helical springs to resist pivotal movements of said arms, in combination, a stabilizer and helper spring in the form of a long leaf spring spaced adjacent said cross frame and having ends rigidly secured to said lower control arms and being stressed to support part of the load to raise said cross frame after said helical springs have shortened from use, and clamping means clamping said lower control arm shafts to said leaf spring inwardly of the connected ends of the leaf spring, whereby the leaf spring acts as a helper spring, stabilizer and shock absorber and whereby pivotal movements of said arms will be resisted by said leaf spring.

References Cited in the file of this patent

UNITED STATES PATENTS

| | | |
|---|---|---|
| 1,742,387 | Gatter | Jan. 7, 1930 |
| 2,004,068 | Woodling | June 4, 1935 |
| 2,496,906 | Churchill | Feb. 7, 1950 |
| 2,497,459 | Leighton | Feb. 14, 1950 |
| 2,589,009 | Leighton | Mar. 11, 1952 |
| 2,695,168 | Westra | Nov. 23, 1954 |